US011342732B2

(12) United States Patent
    Boccato (10) Patent No.: US 11,342,732 B2
(45) Date of Patent: May 24, 2022

(54) APPARATUS AND PROCESS FOR PREPARING AN END PORTION OF A SHIELDED ELECTRICAL CABLE

(71) Applicant: Curti Costruzioni Meccaniche S.p.A., Castel Bolognese (IT)

(72) Inventor: Enrico Boccato, Castel Bolognese (IT)

(73) Assignee: Curti Costruzioni Meccaniche S.p.A., Castel Bolognese RA (IT)

( * ) Notice: Subject to any disclaimer, the term of this patent is extended or adjusted under 35 U.S.C. 154(b) by 39 days.

(21) Appl. No.: 16/762,979

(22) PCT Filed: Nov. 13, 2018

(86) PCT No.: PCT/IB2018/058913
    § 371 (c)(1),
    (2) Date: May 11, 2020

(87) PCT Pub. No.: WO2019/092681
    PCT Pub. Date: May 16, 2019

(65) Prior Publication Data
    US 2020/0313407 A1    Oct. 1, 2020

(30) Foreign Application Priority Data
    Nov. 13, 2017    (IT) .................. 102017000129369

(51) Int. Cl.
    *H02G 1/12*    (2006.01)
    *H01B 13/00*    (2006.01)
(52) U.S. Cl.
    CPC ....... *H02G 1/1297* (2013.01); *H01B 13/0036* (2013.01)

(58) Field of Classification Search
    CPC .... H02G 1/1297; H01B 13/0036; H01B 9/02; Y10T 29/49174; Y10T 29/532
    USPC .......................................... 29/825, 857, 745
    See application file for complete search history.

(56) References Cited

U.S. PATENT DOCUMENTS

| 4,719,697 A | 1/1988 | Schwartzman et al. |
| 5,074,169 A | 12/1991 | Matz |
| 6,330,839 B1 * | 12/2001 | Amrein ................ H02G 1/1273 81/9.51 |

(Continued)

FOREIGN PATENT DOCUMENTS

| CN | 101034794 | 9/2007 |
| CN | 101142051 | 3/2008 |

(Continued)

OTHER PUBLICATIONS

International Search report and written opinion issued by the EPO dated Mar. 7, 2019 for PCT/IB2018/058913.

(Continued)

*Primary Examiner* — Donghai D Nguyen
(74) *Attorney, Agent, or Firm* — Silvia Salvadori (57) ABSTRACT

An apparatus and process for preparing an end portion (1*a*) of a shielded electrical cable (1) wherein the apparatus (10) includes at least one contact element (8) with a contact surface (8*a*) adapted to engage the outer surface of the end portion (1*a*) of the cable (1), movement means (9) to move the contact element (8) with respect to the cable (1), and a logic control unit (20) in which at least one movement path around the longitudinal axis (A-A) of the cable (1) is stored or acquired.

17 Claims, 6 Drawing Sheets

(56) References Cited

U.S. PATENT DOCUMENTS 7,395,592 B2    7/2008    Matsumura et al.
8,291,578 B2    10/2012    Matsuoka
9,520,700 B2 *    12/2016    Stepan .................... B26D 7/08

FOREIGN PATENT DOCUMENTS

| CN | 103887740 | 6/2014 | |
|----|-----------|--------|---|
| EP | 2 747 225 | 6/2014 | |
| JP | 2001 357959 | 12/2001 | |
| WO | 2006075209 | 7/2006 | |
| WO | 20080062375 | 5/2008 | |
| WO | WO-2008062375 A2 * | 5/2008 | ............... H02G 1/12 |

OTHER PUBLICATIONS

Office Action issued by the CN Patent Office dated Mar. 3, 2021 for corresponding CN patent application No. 2021022602222430.
Office Action issued by the European Patent Office dated May 3, 2021 for corresponding EP patent application No. 18816228.3.

\* cited by examiner

APPARATUS AND PROCESS FOR PREPARING AN END PORTION OF A SHIELDED ELECTRICAL CABLE

This application is a U.S. national stage of PCT/IB2018/058913 filed on 13 Nov. 2018, which claims priority to and the benefit of Italian Application No. 102017000129369 filed on 13 Nov. 2017, the contents of which are incorporated herein by reference in their entireties.

FIELD OF THE INVENTION

The present invention concerns an apparatus and process for preparing the end portion of an electrical cable. The present invention is particularly useful in the field of shielded electrical cables and, in particular, in the field of coaxial cables.

KNOWN PRIOR ART

Shielded electrical cables are known, comprising one or more conductors dielectrically insulated and provided with a so-called "shielding braid" made of an electrically conductive material, which acts as an electromagnetic shield to counter or at least limit the electromagnetic interference (EMI).

For example, coaxial cables have a single central conductor (named core), generally made of copper, and a layer of electrically insulating material (a dielectric), generally made of polyethylene or PTFE, which separates the central core from a shielding braid so that to constantly ensure the electrical insulation between the core and shielding braid.

The shielding braid is arranged around the layer of electrically insulating material and is constituted by braided metal wires (such as copper or aluminum for example) so that to form a mesh.

The shielded cables can be provided, in addition to the shielding braid, with a metal sheet, for example an aluminum sheet with a thickness of 0.1 mm, arranged around the dielectric sheathing the core (or generally one or more conductors) of the shielded electrical cable. In other words, the metal sheet, constituting a further shield of the cable, is interposed between the electrically insulating material (dielectric) and the braid.

There is a protective sheath, typically made of an electrically insulating material, on the outside of the shielding braid.

The shielded electrical cables can also be provided with electrical connectors connected to the ends of the electrical cable. For example, in order to constrain a connector at the end portion of a coaxial cable, the end portion of the electrical cable must be prepared by carrying out a process typically comprising the following steps:
  removing a portion of the outer protective sheath, so that to leave the shielding braid exposed in an end portion of the electrical cable for a given length;
  removing a portion of the exposed shielding braid to shorten the exposed shielding braid portion so that to obtain the end part of the end portion of the cable having the dielectric exposed;
  opening the exposed and shortened portion of the shielding braid, to distance the metal wires of the shielding braid from the dielectric sheathing the core of the cable, so that to obtain an end portion of the shielding braid having a substantially cone-like shape diverging towards the free end of the end portion of the electrical cable, and generally shaped so that the shielding braid is raised and, therefore, away from the dielectric (or shielding sheet, whenever present).

The opening of the shielding braid is a crucial operation of the preparation process of the end portion of a shielded electrical cable.

Some processes of the known art, such as the one described in U.S. Pat. No. 8,291,578 for example, open the shielding braid by applying pressure on the outer surface of the braid by means of a couple of punches, which, by pressing on two opposite areas of the outer surface of the shielding braid, in a radial direction towards the core of the electrical cable, deform the braid by bending it so that to make it assume a shape diverging towards the free end of the end portion of the electrical cable.

The opening of the shielding braid obtained by means of this process can be non-uniform, i.e. with some wires of the braid at a greater distance from the dielectric with respect to other wires. In some cases, in order to prevent part of the shielding braid from remaining in contact with the dielectric of the coaxial cable, greater pressure must be applied, or pressure must be applied several times, therefore increasing the risk of damaging the shielding braid and, possibly, of also damaging the shielding sheet (whenever present) arranged between the dielectric and the braid.

In order to avoid the risk of damaging the braid, some methods of the known art provide to move the core of the end portion of the cable with respect to the rest of the cable, therefore maintaining a part distant from the end portion of the cable at a fixed position. U.S. Pat. No. 7,395,592 provides, for example, that the end portion of the cable is bent with respect to the longitudinal axis of the cable itself, making the core (or central conductor) carry out a rotary motion, which describes a substantially cone-like shaped surface. If, on one hand, the movement of the core allows to limit the risk of damaging the shielding braid during the opening process, such method increases the risk of damaging the core of the electrical cable (i.e. the inner conductor) on the other, particularly whenever the cable has reduced section.

Moreover, this method is very likely to damage/deform the aluminum sheet interposed between the electrically insulating material (dielectric) and the braid.

U.S. Pat. No. 4,719,697 describes a process for preparing an end portion of a coaxial cable, wherein the opening of the shielding braid occurs by means of a disk, whose edge is arranged in contact with the outer surface of the braid and rotated around the longitudinal axis of the electrical cable to apply a pressure around the outer surface of the braid. The disk is mounted at the end of a supporting arm, which is constrained to a shaft rotated by an electric motor. The supporting arm is positioned by means of a manual movement system, which determines the oscillation of the supporting arm between a resting position, wherein the shaft is not rotated, and a predetermined operative position, wherein the shaft is rotated. Although this solution allows to improve the uniformity of the opening of the shielding braid for a given section of the coaxial cable, this apparatus is not able to balance the construction tolerances of different coaxial cables, therefore limiting the level of reliability and repeatability of the opening system. Moreover, the manual movement system of the arm on which the disk is mounted in the operative position is both complicated to obtain, as wells as unreliable and imprecise in terms of use.

Object of the present invention is to solve the aforesaid drawbacks and to provide a process and an apparatus for preparing the end portion of a shielded electrical cable that is able to carry out the opening of the shielding braid with high level of reliability and repeatability.

Further object of the present invention is to provide a process and an apparatus for preparing the end of a shielded electrical cable that is able to carry out the opening of the shielding braid in a uniform way and without a risk of damaging the shielding braid and/or central conductor of the shielded electrical cable.

SUMMARY OF THE INVENTION

These and other objects are obtained by the present invention through an apparatus for preparing the end of a shielded electrical cable according the independent claim 1 and a process for preparing the end of a shielded electrical cable according to the independent claim 10. Further characteristics/aspects of the present invention are indicated in the respective dependent claims. It should immediately be noted that what is described and/or claimed herein, with reference to the process, can be applied to the apparatus and vice-versa.

The apparatus for preparing an end portion of a shielded electrical cable according to the invention, wherein the outer surface of the end portion has a shielding braid arranged around at least one layer of electrically insulating material sheathing at least one conductor of the cable, comprises at least one contact element provided with a contact surface adapted to engage the outer surface of the end portion of the cable in order to apply a pressure adapted to deform the braid, movement means to move the contact element with respect to the cable, and a logic control unit in which at least one movement path around the longitudinal axis of the cable is stored or acquired.

The logic control unit is configured to control the movement means depending on at least one path to move the contact element along the path and to adjust the distance between the longitudinal axis of the cable and the contact surface of the contact element.

"Adjusting the distance" means both the setting of the distance (at a value for example) and the modifying of the distance. For example, the distance can be modified while using the apparatus and/or while implementing the process of the present invention; the distance can be set at a value selected according to the cable to be treated. During the process, it may also be possible not to modify this value.

Advantageously, the presence of a control unit intended to control the movement of the movement means of the contact element in contact with the braid allows to obtain a quick, simple, certain and repeatable control of the movement of the contact element intended to engage the braid.

Moreover, unlike the apparatus known in the art, the movement described by the contact element in contact with the braid, and therefore the path causing the deformation of the braid, can be suitably selected and possibly modified, in fact, the control unit controls the movement means of the contact element depending on one or more paths.

It should be noted that one or more paths can be advantageously stored in, or acquired by, the control unit and used to control the movement of the contact element in the most desirable and effective way. It should be noted that the acquisition of one or more paths can also provide the modification, in real time, of the path on the basis of one or more operative parameters that can be estimated and/or detected by suitable sensors. The possibility that one or more paths of the contact element are used by the control unit to control the movement means of the contact element allows to increase the versatility of the apparatus according to the invention, which can therefore be easily adapted to the processing of cables of different sizes.

Moreover, the control unit allows to control the movement means in order to adjust the distance between the longitudinal axis of the cable and the contact surface of the contact element in contact with the braid.

Advantageously, this adjustment allows to arrange the contact surface in contact with the braid at the desired distance from the longitudinal axis of the cable and, therefore, with the surface of the braid itself so that to be able to apply the desired pressure adapted to allow the effective opening of the braid.

Moreover, the adjustment of the distance allows to overcome the drawbacks of the apparatus according to U.S. Pat. No. 4,719,697, wherein the manual oscillation movement of the arm on which the disk is arranged, intended to engage the braid, determines its positioning in a single operative position.

According to an aspect of the present invention, the adjustment of the distance between the longitudinal axis of the cable and the contact surface of the contact element with the braid is carried out before achieving the engagement with the braid, and/or whenever the engagement with the braid has already occurred or whenever the movement around the cable is being carried out.

Advantageously, the adjustment of the distance can therefore be carried out for achieving contact with the braid, and/or the distance can be adjusted and, therefore, subsequently modified after contact with the braid, during the movement of the cable around the longitudinal axis.

The adjustment of the distance therefore advantageously allows to adjust the pressure exerted on the braid, optionally also during the deformation movement of the braid around the axis of the cable.

According to an aspect of the present invention, the movement means allow the movement of the contact element with the braid in a plane. More in detail, the adjustment of the distance between the contact surface in contact with the braid and the longitudinal axis of the cable also occurs in a plane, preferably this plane coincides with the plane in which the movement around the longitudinal axis of the cable for the deformation of the braid occurs.

According to a possible embodiment, the movement means allow the movement of the contact element in contact with the braid in a plane perpendicular to the longitudinal axis of the cable. Advantageously, the movement in the plane is simple to control and allows to obtain high cable processing speeds.

According to an aspect of the present invention, the movement means comprise a movement system in the plane (preferably in a plane perpendicular to the axis of the cable), or a Cartesian movement system. For example, according to a possible embodiment, the movement of the contact element with respect to the cable is obtained by combining two linear movements, preferably orthogonal to one another, for example, two linear actuators can be used.

Advantageously, the movement of the contact element through the combination of linear movements is very accurate and quickly thus allowing to obtain a path in the plane, customizable according to said one or more movement paths.

According to an aspect of the present invention, the movement path of the contact element is substantially circular.

Advantageously, the circular path allows the application of the pressure to the contact surface in contact with the braid, along the circumference of the cable, the pressure being intended to cause the deformation and, therefore, the opening of the same braid. According to an aspect of the present invention, the movement path of the contact element has curvilinear shape with variable distance (not constant for example) with respect to the longitudinal axis of the cable, preferably the distance being variable when approaching the longitudinal axis of the cable. According to a possible embodiment, the movement path of the contact element has a substantially flat spiral shape.

Preferably, the process comprises the step of detecting the pressure exerted by the contact element on the cable (for example by means of a load sensor or a load cell). More preferably, the contact element describes a path by maintaining the pressure exerted on the cable constant, or by maintaining the pressure within a value range (for example by means of a feedback control of the distance between the longitudinal axis of the cable and the contact element depending on the pressure detected).

Advantageously, the adjustment of the distance of the contact surface with the braid, with respect to the longitudinal axis of the cable—during the movement around the longitudinal axis—allows to vary the pressure applied on the braid.

As stated, according to an aspect, the contact element preferably has a contact surface adapted to engage the outer surface of the end portion of the shielded electrical cable in order to apply a pressure towards the longitudinal axis of the cable (and, therefore, towards the central conductor), preferably in a radial direction towards the longitudinal axis of the cable.

The contact element, and in particular its contact surface, engages the braid at a distance from the free end of the end portion of the electrical cable. This way, the pressure is exerted at a distance from the free end of the braid, allowing to obtain an end portion of the shielding braid, having a substantially cone-like shape diverging towards the free end of the end portion of the electrical cable, and generally shaped so that the shielding braid is raised and, therefore, away from the dielectric (or shielding sheet, whenever present).

According to an aspect, the contact element can be disk-shaped and arranged perpendicularly to the longitudinal axis of the shielded electrical cable. More in detail, according to a possible embodiment, the contact element is made disk-shaped, the disk extending in a plane perpendicular to the longitudinal axis of the cable (preferably, the movement means move the disk in the plane in which it extends).

According to a possible embodiment, the contact surface of the contact element is a curved surface, preferably a circular surface. For example, according to a possible embodiment wherein the contact element is disk-shaped, the circular contact surface corresponds to the circumference delimiting the disk (perimetric circumference). The contact surface is therefore the continuous circular surface delimiting the disk.

BRIEF DESCRIPTION OF THE FIGURES

Further aspects and advantages of the present invention will become clearer in the following description, made by way of example, as a purely indicative reference and without limitations with regard to the schematic drawings of the accompanying figures, in which.

EMBODIMENTS OF THE INVENTION

Figure 1A:
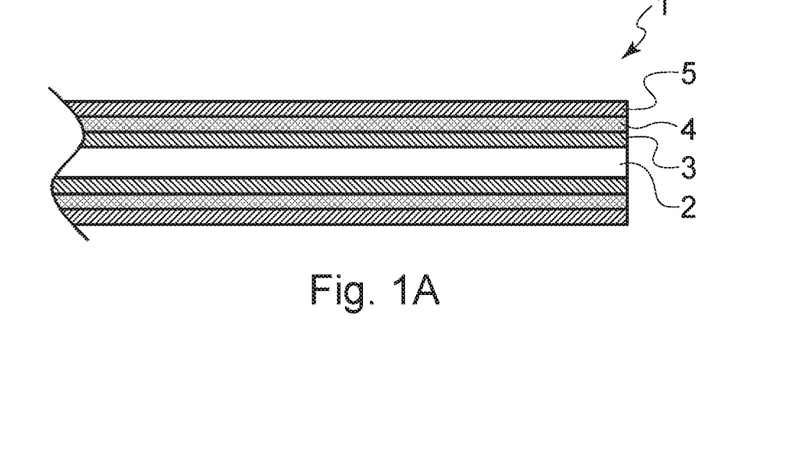
FIGS. 1A, 1B and 1C schematically show sectional longitudinal views of a shielded cable during some possible preparation steps that can be carried out before carrying out the process according to the present invention.

With reference to FIG. 1A, a shielded electrical cable 1 typically comprises a central conductor 2 and a shielding braid 4 separated by one layer of electrically insulating material 3, or dielectric, sheathing the central conductor 2. As mentioned, according to some possible embodiments, a further shielding layer, for example constituted by a thin aluminum sheet not shown in the accompanying figures for simplicity, can be arranged between the braid 4 and the dielectric 3.

Figure 1B:
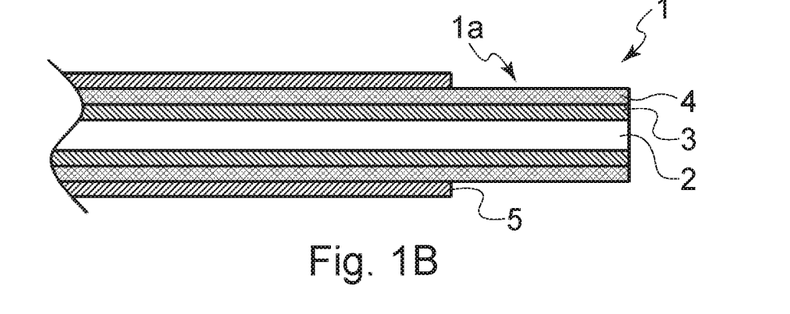

A protective sheath 5, typically also made of an electrically insulating material, is present around the shielding braid 4. With reference to FIG. 1B, the end portion 1a of the electrical cable 1 is typically prearranged by removing a given length of the protective sheath 5, so that to leave the shielding braid 4 of the end portion 1a of the electrical cable 1 exposed.

Figure 1C:
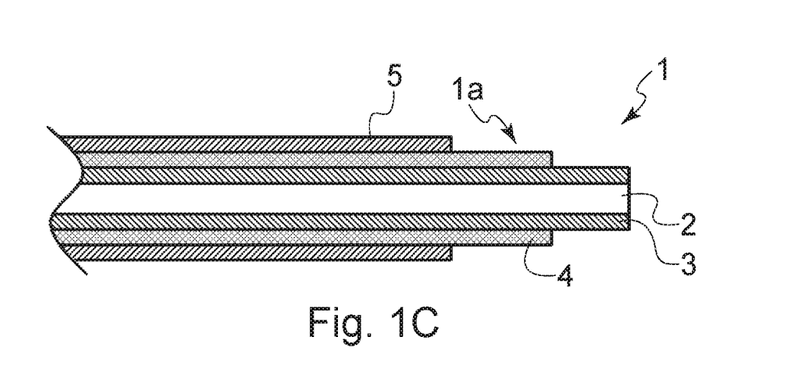

With reference to FIG. 1C, the exposed part of the shielding braid 4 is preferably shortened to leave a portion of the electrically insulating layer 3 sheathing the central conductor 2 of the shielded electrical cable 1 exposed. The end portion 1a of the shielded electrical cable 1, as prearranged, is therefore ready to be subjected to the opening step of the shielding braid 4.

Figures 2A, 2B:
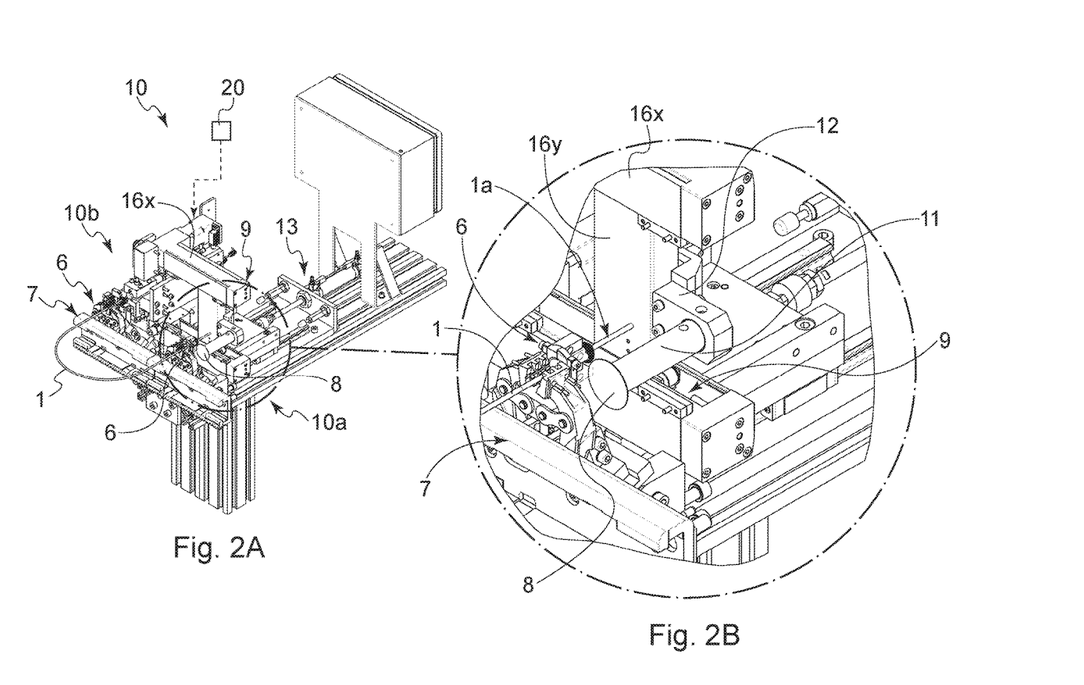
FIG. 2A schematically shows a perspective view of an apparatus for preparing an end portion of a shielded cable according to a possible embodiment of the present invention.
FIG. 2B schematically shows an enlargement of the perspective view of FIG. 2A.

With reference to FIGS. 2A and 2B, the apparatus 10 for the preparation of an end portion 1a of a shielded electrical cable 1 comprises a work station 10a, in which the opening of the shielding braid 4 is carried out. In particular, the end portion 1a of a shielded electrical cable 1 is preferably restrained by means of a clamp 6, or similar restraining element, that can advantageously be moved along a guide 7 arranged between one or more work stations 10a, 10b. The work station 10b can be a work station adapted to carry out a preceding processing (for example to shorten the exposed shielding braid) or following (for example to overturn the open shielding braid) at the opening of the shielding braid.

For example, the embodiment shown in FIGS. 2A and 2B provide that the shielded electrical cable 1 is restrained by both of the two free ends, by means of two respective clamps 6 sliding along the guide 7, for example whenever both of the ends of the cable have to be processed. With reference to FIG. 2B, the end portion 1a of the electrical cable is arranged in front of the work station 10a adapted to carry out the opening of the shielding braid 4 according to the process of the present invention.

The apparatus 10 comprises a contact element 8 preferably being disk-shaped and provided with a contact surface 8a adapted to be arranged on the outer surface of the end portion 1a of the shielded electrical cable and, therefore, engaged therewith in order to apply a pressure adapted to deform the shielding braid 4.

The contact element 8 preferably has a contact surface 8a adapted to engage the outer surface of the end portion 1a of the shielded electrical cable 1 in order to apply a pressure towards the longitudinal axis A-A of the cable 1, preferably in a radial direction towards the longitudinal axis A-A of the cable 1.

According to a possible embodiment, as, for example, visible in the accompanying figures, the contact element 8 can be disk-shaped and arranged perpendicularly to the longitudinal axis A-A of the shielded electrical cable 1. As, for example, shown in the accompanying figures, the surface contact 8a is preferably the perimetric circumference of the contact element 8 made like a disk.

The apparatus 10 further comprises movement means 9 configured to move the contact element 8 with respect to the cable 1, so that the contact element 8 describes a path arranged around the longitudinal axis A-A of the cable 1.

The movement means 9 are further configured to adjust the distance D between the longitudinal axis A-A of the cable 1 and the contact surface 8a of the contact element 8 to control the path described by the contact element 8 around the longitudinal axis A-A of the shielded electrical cable 1.

The apparatus 10 comprises a logic control unit 20 (schematically shown in FIG. 2A), in which at least one movement path of the contact element 8 is stored or acquired. The logic control unit 20 controls the movement means 9 depending on the stored or acquired path in order to move the contact element 8 along the aforesaid path and to adjust the distance D between the longitudinal axis A-A of the shielded electrical cable 1 and the contact surface 8a of the contact element 8. As mentioned, the adjustment of the distance D includes setting the distance and/or modifying the distance.

In the embodiment shown in FIGS. 2A and 2B, the contact element 8 is constrained to a supporting arm 11, which is in turn constrained to a movement arm 12 coupled with the movement means 9. The supporting arm 11 is preferably constrained to the movement arm 12 by means of a bearing (not shown in the figures) so that the supporting arm 11 is axially constrained to the movement arm and can freely rotate (together with the contact element 8) around its longitudinal axis. In other words, the contact element 8 is preferably a disk free to rotate around a rotation axis parallel to the longitudinal axis A-A of the shielded electrical cable 1.

The movement arm 12 is constrained to a Cartesian movement system preferably provided with a couple of linear actuators 9x, 9y adapted to move the movement arm 12 (and, therefore, the contact element 8) along two linear movements, x and y, orthogonal to each other.

As will be described more in detail here below, it is possible to move the contact element 8 along a path arranged on the plane, in which the movement directions of the linear actuators lie, by combining the two linear movements.

Further embodiments can, however, provide that the movement means 9 comprise an electric motor adapted to rotate the contact element along a path around a rotation axis substantially coinciding with the longitudinal axis of the shielded electrical cable 1 and a linear actuator to translate the contact element along a radial direction with respect to the rotation axis of the electric motor. The radial movement direction and the rotational movement direction preferably lie on the same plane.

With reference to FIG. 2A, the movement means 9 (for example the whole Cartesian movement system) can be translated along a movement direction parallel to the longitudinal axis A-A of the electrical cable 1 (which is preferably orthogonal to the plane xy defined by the aforesaid Cartesian movement system 9) by translating means 13 that can comprise, for example, pneumatic, hydraulic and electric actuators or further actuators known per se in the art.

The movement means 9 can be translated between a resting position P1, wherein the arrival of an end portion 1a of the cable 1 from the work station 10a is awaited, and a working position P2, wherein the movement system 9 is ready to move the contact element in order to carry out the opening of the shielding braid 4.

Figure 3A:
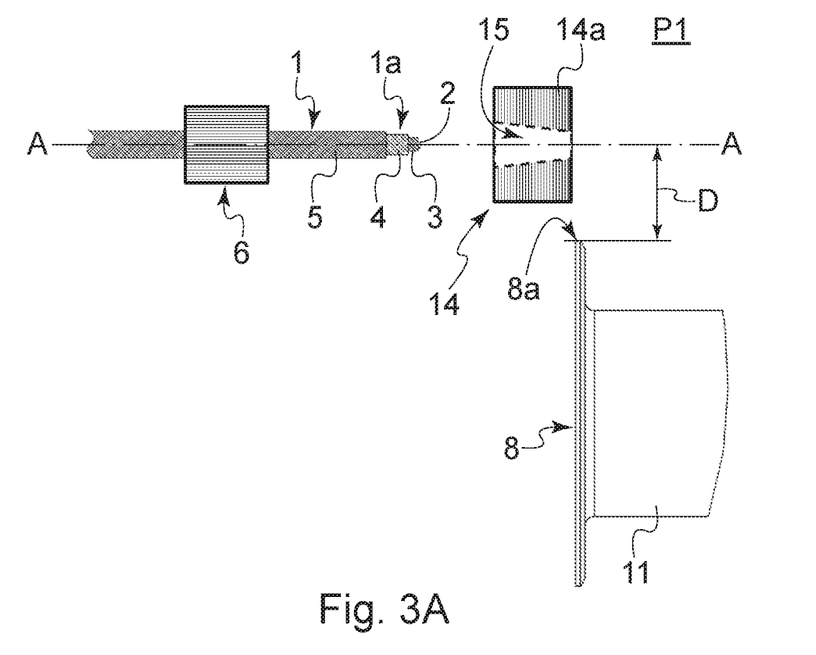
FIGS. 3A and 3B schematically show two views from above of a possible embodiment of a contact element of the apparatus according to the present invention during two possible operating steps.
Figure 3B:
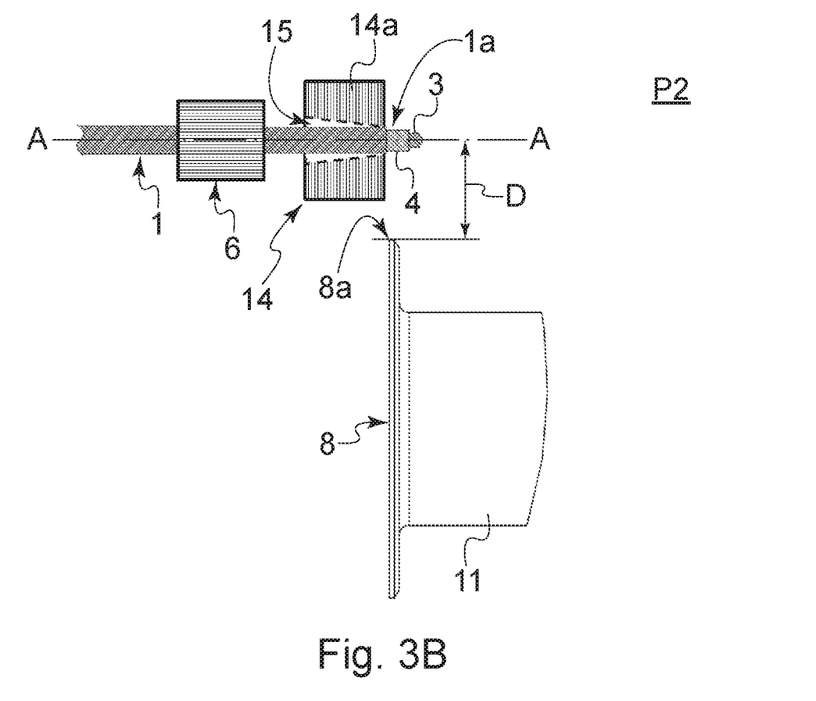

When the end portion 1a of the shielded electrical cable 1 is brought next to the work station 10a, in order to carry out the opening of the shielding braid, the Cartesian movement system 9 is translated by the translating means 13 from the resting position P1 (shown in FIG. 3A) to the working position P2 (shown in FIG. 3B).

With reference to FIGS. 3A and 3B, the apparatus 10 preferably comprises radial positioning means 14 configured to center and support the portion of the electrical cable 1 comprised between the clamp 6 and the free end of the electrical cable 1 in axis.

The radial positioning means 14 preferably comprise a body 14a provided with a through-hole 15 for the passage of the end portion 1a of the shielded electrical cable 1. The body 14a is constrained to the movement means 9 of the apparatus 1 so that the longitudinal axis of the through-hole 15 is substantially coinciding with the longitudinal axis A-A of the shielded electrical cable 1 restrained by the clamp 6. The body 14a of the radial positioning means 14 is also constrained to the movement means 9 so that to be at a fixed distance from the plane on which the movement path of the contact element 8 lies.

In other words, when the translating means 13 translate the movement means 9 between the resting position P1 and the working position P2, both the body 14a and the contact element 8 are translated together.

When the movement means 9 are translated from the resting position P1 shown in FIG. 3A to the working position P2 shown in FIG. 3B, the end portion 1a of the electrical cable 1 passes through the through-hole 15 and comes out of the body 14a. According to a possible embodiment, in order to facilitate the entry of the end portion 1a of the cable 1, the through-hole 15 is tapered so that the inlet opening is larger than the outlet opening.

Once the movement means 9 are in the working position P2 (for example shown in FIG. 3B), the contact element 8 can be moved to contact (engage) the outer surface of the shielding braid 4 in order to carry out the opening of the braid. In particular, a logic control unit 20 controls the movement means to adjust the distance D from the contact surface 8a of the contact element 8 and the longitudinal axis A-A of the electrical cable 1, which substantially coincides with the longitudinal axis of the through-hole 15 of the radial positioning means 14.

Figure 4A:
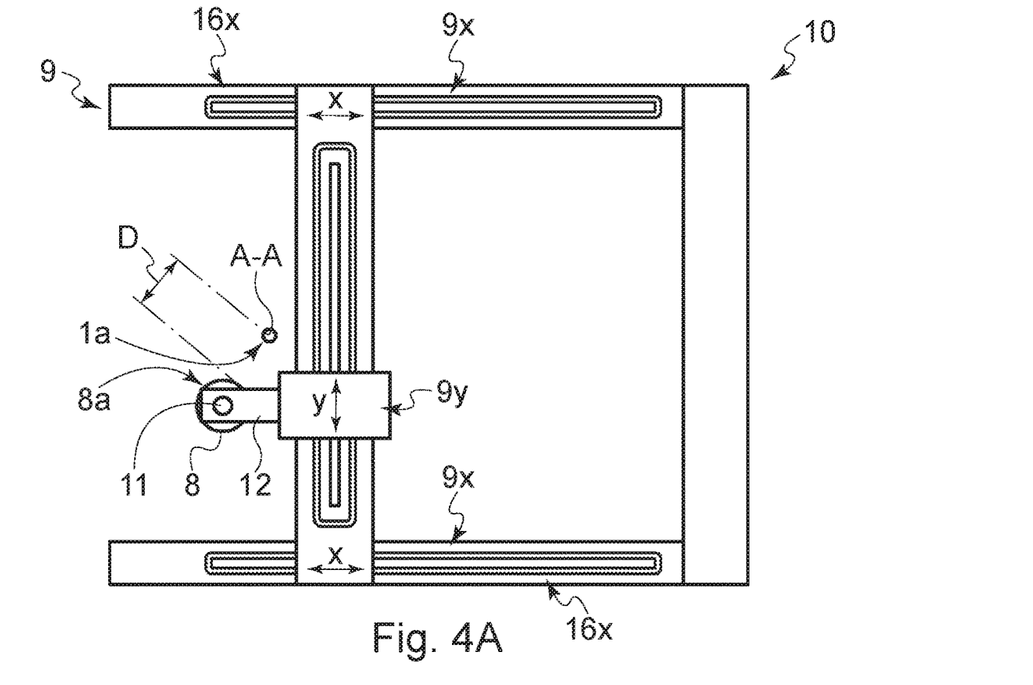
FIGS. 4A-4C are front views of a possible embodiment of the movement means of the apparatus according to the present invention and which schematically show some steps of the process for preparing an end portion of a shielded electrical cable according to a possible embodiment of the present invention.
Figure 4B:
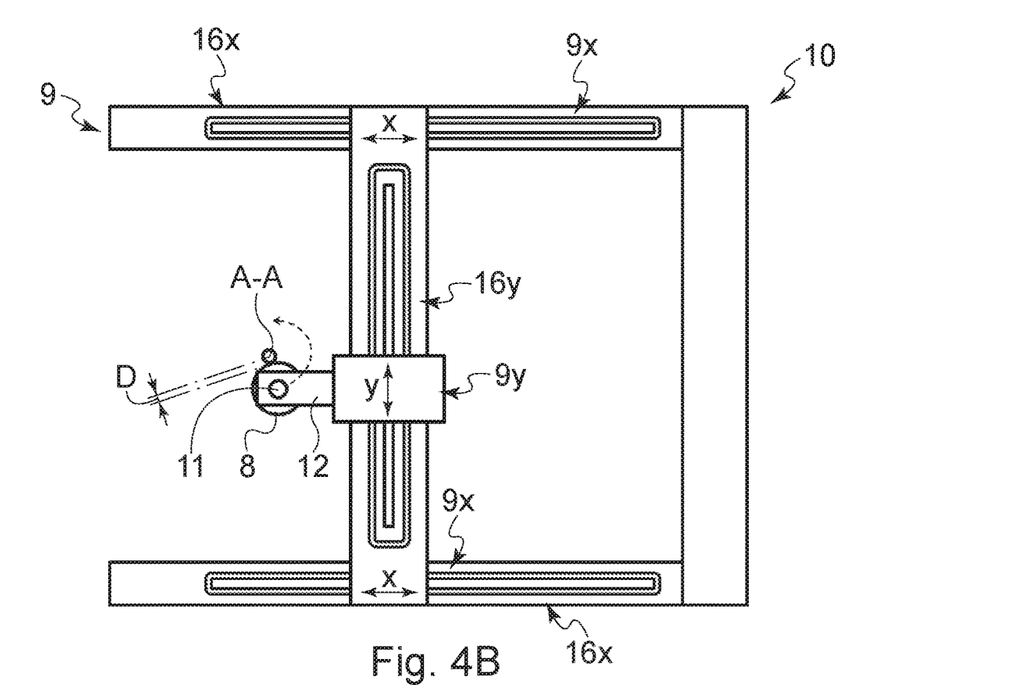
Figure 4C:
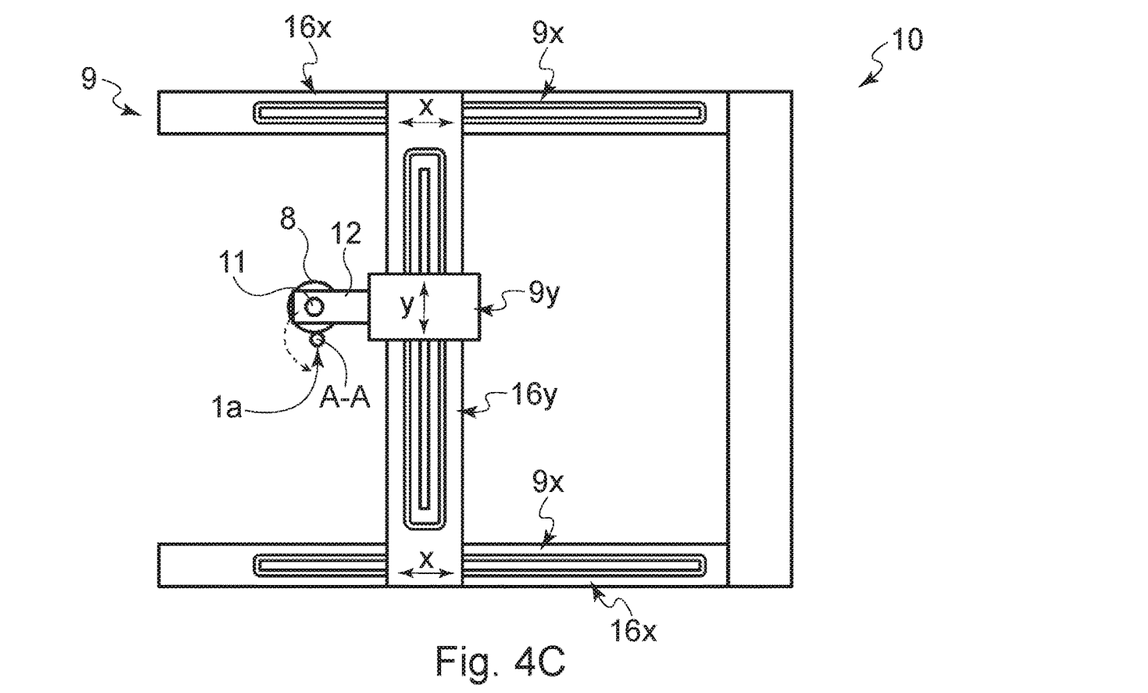

With reference to FIGS. 4A-4B, the contact element 8 is first moved to be brought into contact, and therefore to be engaged, with the outer surface of the end portion of the electrical cable 1, and in particular to be brought into contact, and therefore to be engaged, with the braid 4 (for example, see the movement between FIGS. 4A and 4B). Subsequently, the contact element 8 is moved along a path around the axis of the cable, for example according to a curved anticlockwise rotation path, such as, for example, visible when comparing FIGS. 4B and 4C.

The logic control unit 20 controls the movement of the linear electrical actuators 9*x*, 9*y* depending on a movement path that can be stored within a memory of the logic control unit 20 or determined by one or more operative processing parameters acquired through sensors or manually entered.

In particular, the movement arm 12 is constrained to a first linear actuator 9*y* movable along a first guide 16*y* (for example a track or sliding shaft) and comprising, for example, a magnetic linear motor or a motorized carriage (for example by means of a pinion coupled with a transmission belt or chain). The first guide 16*y* is in turn coupled with a second guide 16*x* and moved along the second guide 16*x* by one or more linear actuators 9*x* analogously to what was described for the linear actuator 9*y*. In particular, the first guide 16*y* is coupled, at its ends, with a couple of second guides 16*x* perpendicular to the first guide, therefore forming a Cartesian movement system 9 shown in FIGS. 2A and 2B.

The movement path acquired by or stored in the logic control unit 20 can, for example, provide for moving the contact element along a circumference, substantially maintaining constant the distance D between the contact surface 8*a* of the disk 8 and the longitudinal axis A-A of the electrical cable 1. The distance D can be determined depending on the section of the electrical cable 1 and/or on the type of shielding braid (material of the wires and/or section of the metal wires constituting the braid), so that to apply adequate pressure around the outer surface of the shielding braid 4 and adapted to deform the braid without a risk of damaging it.

A further embodiment can provide that the movement path acquired by or stored in the logic control unit 20 provides that the contact element 8 describes a path having a substantially flat spiral shape for at least a part of the movement path. In other words, during the movement of the contact element 8 around the end portion 1*a* of the electrical cable 1, the distance D between the contact surface 8*a* of the disk 8 and the longitudinal axis A-A of the electrical cable 1 is modified so that to apply a pressure of variable intensity around the outer surface of the shielding braid 4.

A further embodiment can provide that the logic control unit 20 is configured to control the translating means 13 in order to translate the movement means 9 between a plurality of operative positions. In each operative position, the movement means 9 move the contact element 8 along a path around the longitudinal axis A-A of the electrical cable 1. In each operative position of the movement means 9, the paths described by the contact element 8 lie on parallel planes.

A further embodiment can also provide that the logic control unit 20 is configured to control the movement means 9 according to signals originating from a load sensor (for example a load cell, for example mounted on the supporting arm 11 or on the movement arm 12), which detects the force (or pressure) exerted by the contact element 8, substantially maintaining the load (or pressure) constant between the contact surface 8*a* of the disk 8 and the outer surface of the shielding braid 4 and adapted to deform the braid, without a risk of damaging it.

Summarizing, the main operating steps of the apparatus 10 according to the present invention are:

(a) moving a contact element 8 with respect to a shielded electrical cable 1, so that the contact element 8 describes a movement path around the longitudinal axis A-A of the cable 1, in order to apply a pressure adapted to deform the shielding braid;

(b) adjusting the distance D between the longitudinal axis A-A of the shielded electrical cable 1 and the contact surface 8*a* of the contact element 8 to control the path described by the contact element 8 around the longitudinal axis A-A of the electrical cable 1.

The step (b) can be carried out before the contact element 8 is put in contact with the shielding braid 4 of the electrical cable 1 (to bring the contact element on the outer surface of the braid), and/or during the movement of the contact element around the longitudinal axis of the shielded cable (to maintain the distance D constant or to change the distance D so that to describe a path having a substantially flat spiral shape or to maintain the load, with which to act on the shielding braid, constant).

Figure 5:
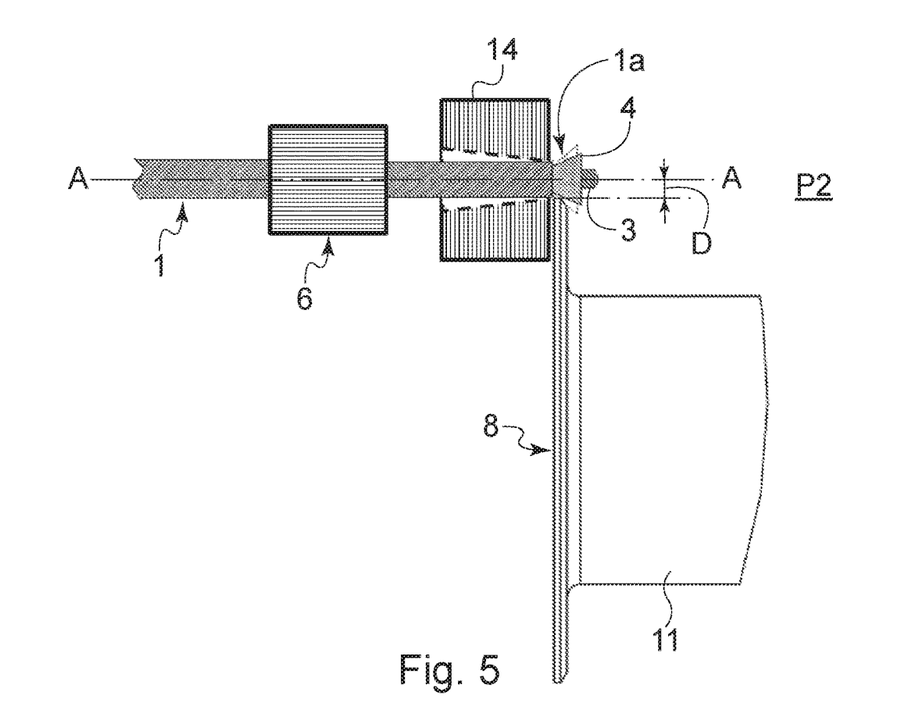
FIGS. 5 and 6 schematically show two views from above of the contact element shown in FIGS. 3A and 3B during further two possible operating steps of the apparatus according to a possible embodiment of the present invention.
Figure 6:
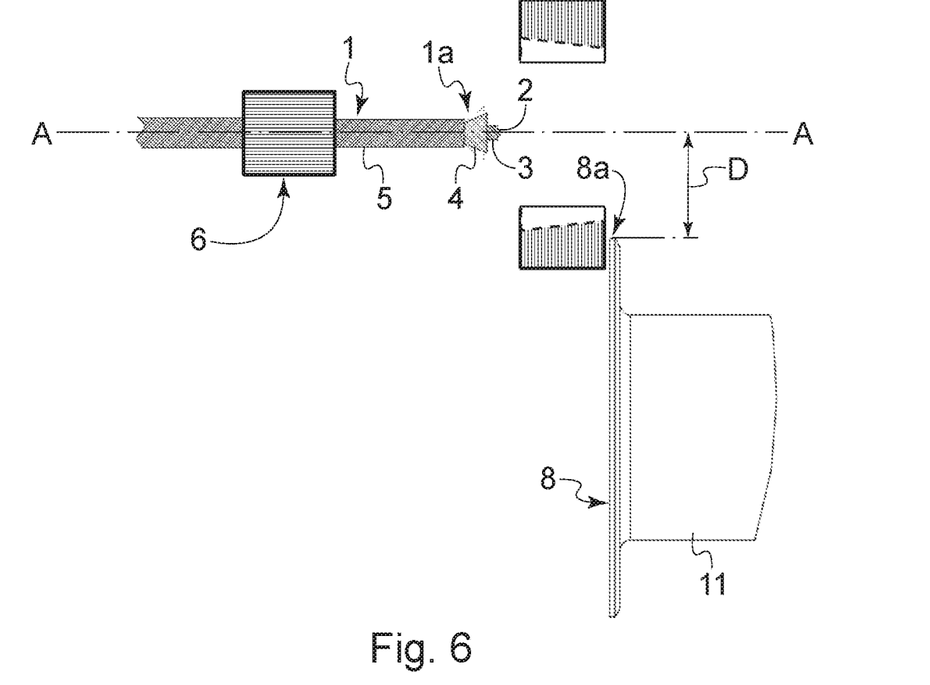
Figure 7:
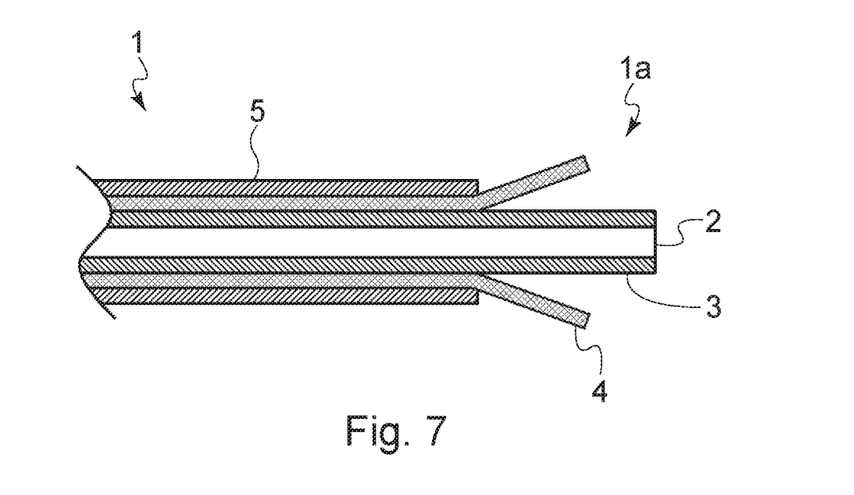
FIG. 7 schematically shows a sectional longitudinal view of a shielded cable during some possible steps of an embodiment of the process of the present invention.

With reference to FIG. 5, during the step (a), the contact element 8 applies a pressure around the outer surface of the shielding braid 4, which is deformed and assumes a substantially cone-like shape diverging towards the free end of the electrical cable 1, as shown more clearly in FIG. 7. At the end of the process, the contact element 8 has made one or more revolutions around the end portion 1*a* of the electrical cable 1 and the end portion 1*a*, having the shielding braid open, can be moved towards a subsequent work station. In order to allow the movement, the translating means 13 preferably bring the movement means 9 towards the resting position P1. Whenever the apparatus 10 is provided with radial positioning means 14, the body 14*a* preferably comprises two openable parts. In particular, with reference to FIG. 6, at the end of the opening process of shielding braid 4, the two parts of the body 4 are distanced from the longitudinal axis of the through-hole 15 so that not to compromise the opening of the shielding braid during the translation of the movement means 9 towards the resting position P1.

The invention claimed is:

1. Apparatus (10) for preparing an end portion (1*a*) of a shielded electrical cable (1), said end portion having an outer surface, wherein the outer surface of said end portion (1*a*) has a shielding braid (4) arranged around at least one layer of electrically insulating material (3) sheathing at least one conductor (2) of said shielded electrical cable (1), said apparatus (10) comprising a contact element (8) provided with a contact surface (8*a*) adapted to engage the outer surface of said end portion (1*a*) of the cable (1) in order to apply a pressure adapted to deform said shielding braid (4), movement means (9) to move said contact element (8) with respect to said cable (1), and a logic control unit (20) in which at least one movement path around a longitudinal axis (A-A) of said cable (1) is stored or acquired, said logic control unit (20) being configured to control said movement means (9) depending on said at least one path to move said contact element (8) along said path and to adjust a distance (D) between the longitudinal axis (A-A) of said shielded electrical cable (1) and said contact surface (8*a*) of said contact element (8), wherein said movement means (9) comprise two linear actuators (9*x*, 9*y*) configured to move said contact element (8) with respect to said shielded electrical cable (1) by combining two linear movements along at least two axes, and wherein said linear movements lie on a plane substantially perpendicular to the longitudinal axis (A-A) of said shielded electrical cable (1).

2. Apparatus (10) according to claim 1, wherein said movement means (9) are configured to adjust the distance (D) between the longitudinal axis (A-A) of said shielded electrical cable (1) and said contact surface (8*a*) of said contact element (8) during the movement of said contact element (8) with respect to said shielded electrical cable (1) along said path.

3. Apparatus (10) according to claim 1, wherein said movement means (9) are configured to move said contact element (8) and/or to adjust the distance (D) between the longitudinal axis (A-A) of said shielded electrical cable (1) and said contact surface (8*a*) of said contact element (8) by moving said contact element (8) with respect to said shielded electrical cable (1) on a plane.

4. Apparatus (10) according to claim 1, wherein said linear movements are orthogonal to one another.

5. Apparatus (10) according to claim 1, wherein said at least one path has a substantially circular shape.

6. Apparatus (10) according to claim 1, wherein said at least one path has a substantially flat spiral shape.

7. Apparatus (10) according to claim 1, wherein said contact surface (8*a*) of said contact element (8) is a curved surface.

8. Process for preparing an end portion (1*a*) of a shielded electrical cable (1), said end portion having an outer surface, wherein the outer surface of said end portion (1*a*) has a shielding braid (4) arranged around at least one layer of electrically insulating material (3) sheathing at least one conductor (2) of said cable (1), said process comprising the following steps:
   (a) moving a contact element (8) with respect to said shielded electrical cable (1), so that said contact element (8) describes at least one movement path around a longitudinal axis (A-A) of said shielded electrical cable (1), said contact element (8) being provided with a contact surface (8*a*) adapted to engage the outer surface of said end portion (1*a*) of said cable (1) in order to apply a pressure adapted to deform said shielding braid (4);
   (b) adjusting a distance (D) between the longitudinal axis (A-A) of said shielded electrical cable (1) and said contact surface (8*a*) of said contact element (8);
   wherein said at least one path is stored or acquired in a logic control unit (20) configured to control a movement means (9) of said contact element (8) to carry out said steps a) and b) depending on said path,
   wherein said movement means (9) comprise two linear actuators (9*x*, 9*y*) configured to move said contact element (8) with respect to said shielded electrical cable (1) by combining two linear movements along at least two axes.

9. Process according to claim 8, wherein at least part of said step (b) is carried out before arranging said contact surface (8*a*) of said contact element (8) engaged with the outer surface of said end portion (1*a*) of the cable (1).

10. Process according to claim 8, wherein at least part of said step (b) is carried out during said step (a).

11. Process according to claim 8, wherein said step (a) and/or said step (b) provide for moving said contact element (8) and/or adjusting the distance (D) of said contact element (8) with respect to said shielded electrical cable (1), on a plane.

12. Process according to claim 8, wherein said linear movements are orthogonal to one another.

13. Process according to claim 8, wherein said contact element (8) describes a path having a substantially circular shape.

14. Process according to claim 8, wherein said contact element (8) describes a path having a substantially flat spiral shape.

15. Process according to claim 8, comprising the step of detecting the pressure applied by said contact element (8) on said cable (1).

16. Process according to claim 15, wherein said contact element (8) describes a path by maintaining constant the pressure applied on the cable (1), or in a predetermined value range.

17. Process according to claim 8, wherein said contact element (8) describes a path by changing the pressure applied on the cable (1).

* * * * *